United States Patent [19]

De Koning et al.

[11] Patent Number: 4,948,821

[45] Date of Patent: Aug. 14, 1990

[54] THERMOSETTING COMPOSITION

[75] Inventors: Adrianus J. De Koning, Sittard; Arnold J. Voskamp, Hoge Zwaluwe, both of Netherlands

[73] Assignee: Stamicarbon B.V., Geleen, Netherlands

[21] Appl. No.: 233,437

[22] Filed: Aug. 18, 1988

[30] Foreign Application Priority Data

Aug. 18, 1987 [NL] Netherlands ............ 8701932

[51] Int. Cl.$^5$ .......................... C08L 67/06; C08K 7/02
[52] U.S. Cl. ............................. 523/500; 523/511
[58] Field of Search ....................... 523/511, 500

[56] References Cited

U.S. PATENT DOCUMENTS

| | | | |
|---|---|---|---|
| 4,102,944 | 7/1978 | Fukuyama et al. | 525/49 |
| 4,260,538 | 4/1981 | Iseler et al. | 525/19 |
| 4,293,686 | 10/1981 | Gardner | 528/192 |
| 4,472,544 | 9/1984 | Ochsenbein et al. | 523/511 |

FOREIGN PATENT DOCUMENTS

| | | | |
|---|---|---|---|
| 0070755 | 1/1983 | European Pat. Off. | |
| 0075765 | 4/1983 | European Pat. Off. | 523/511 |
| 1208886 | 1/1966 | Fed. Rep. of Germany. | |
| 1148479 | 12/1957 | France. | |
| 1511352 | 12/1967 | France. | |
| 2237479 | 5/1976 | France. | |
| 0550221 | 6/1974 | Switzerland. | |
| 1519519 | 7/1978 | United Kingdom. | |
| 2048287 | 12/1980 | United Kingdom. | |

*Primary Examiner*—Lewis T. Jacobs
*Attorney, Agent, or Firm*—Cushman, Darby & Cushman

[57] ABSTRACT

The invention relates to a thermosetting composition comprising

A: 30-65 parts by weight of unsaturated polyester with a molar mass per double bond of 142-500

B: 25-55 parts by weight of ethylenically unsaturated monomer

C: 3-35 parts by weight of slightly ethylenically unsaturated polyester

D: 0-750 parts by weight of filler, fibrous material and, if so desired, other usual additives, characterized in that as as slight ethylenically unsaturated polyester an unsaturated polyester is used which has a molar mass per double bond of 1200-20,000 and an acid number of 5-50, and in which between 50 and 90% of the unsaturation consists of a terminal monoester of a α, β-unsaturated dicarboxylic acid. The composition presents little or no shrinkage in setting.

6 Claims, No Drawings

THERMOSETTING COMPOSITION

The invention relates to a thermosetting composition comprising:

A: 30–65 parts by weight of unsaturated polyester with a molar mass per double bond of 142–500

B: 25–55 parts by weight of ethylenically unsaturated monomer

C: 3–35 parts by weight of slightly ethylenically unsaturated polyester

D: 0–750 parts by weight of filler, fibrous material and, if so desired, other usual additives.

Thermosetting compositions based on unsaturated polyesters shrink in setting.

To prevent shrinkage, thermoplastics are usually added (polystyrene, polyvinylacetate, polymethyl methacrylate, saturated polyesters, etc.). When these additives, which are usually of high molar mass (with molar masses of 10,000–300,000), are added to the polyester resin they cause an increase in viscosity which does not favour the wetting of fillers and glass fibres. Moreover, the thermoplastics do not tolerate the polyester resin very well, which results in separation of the additive.

US-A-4102944 describes an anti-shrinkage additive, namely the reaction product of a saturated polyester with a glycidyl acrylate, which presents the aforementioned disadvantages to a lesser extent. However, in the thickening process the lack of sufficient acid end groups (which are used for the reaction with the glycidyl acrylate) may lead to separation of the additive during thickening with metal oxides or metal hydroxides.

The aim of the invention is to provide a composition with an additive such that a product is obtained that not only has good shrinkage-resistant properties, but also good gloss, colourability, strength and weather resistance.

The aim of the invention is also to provide an additive for thermosetting compositions which has a low viscosity, which forms a stable composition with an unsaturated polyester and which can be thickened along with an unsaturated polyester by metal oxides or metal hydroxides.

The aim of the invention is achieved by using an unsaturated polyester as slightly ethylenically unsaturated polyester, which has a molar mass per double bond of 1200–20,000, an acid number of 5–50 and in which between 50 and 90% of the ethylenic unsaturations consists of a terminal mono-ester of an $\alpha, \beta$-unsaturated dicarboxylic acid.

Rather similar to the proposed compositions are the reaction products of a polyether polyol with maleic anhydride as described in EP-A-70755. These products are also suggested as anti-shrinkage additives in polyester resins.

Surprisingly, it has now been found that if, in addition to the unsaturated end group, polyesters contain a small percentage of ethylenic unsaturations, the anti-shrinkage effect is unexpectedly favourably affected. The smoothness and gloss of the surface and the colourability of the cured products based on polyester compositions in which the additive has been incorporated are considerably improved by this modification.

The properties of the products are very good if the highly and slightly unsaturated polyesters are used in a proportion between 95:5 and 60:40, in particular in a proportion between 90:10 and 70:30. Preferably, the molar mass per double bond of the slightly unsaturated polyester is chosen between 1300 and 5000, in particular between 1500 and 3000.

The slightly unsaturated polyesters described above are known from, for example, EP-A-31977; neither mixtures of those polyesters with highly unsaturated polyesters nor the unexpected good anti-shrinkage effect are described or suggested in that patent.

The unsaturated polymers are mainly synthesized from organic compounds containing carboxyl and alcohol groups. For polyesters diacids and dialcohols are usually used, but up to 40 wt % of both types of bifunctional monomers can be replaced by higher-functional monomers or monofunctional monomers or mixtures hereof. Preferably less than 20 wt % of both types of bifunctional monomers is replaced by a higher-functional monomer. More in particular, 3–10 wt % of one of the two types of bifunctional monomers is replaced by a trifunctional monomer to obtain a branched unsaturated polyester. In this manner a higher molar mass is built up within a shorter time.

The acids that can be used usually contain fewer than 30 carbon atoms, in particular fewer than 20, more in particular fewer than 10 carbon atoms.

As ethylenically unsaturated diacid an $\alpha, \beta$-ethylenically unsaturated diacid is preferably used, for example a diacid chosen from the group comprising fumaric acid, maleic acid, chloromaleic acid, itaconic acid, mesaconic acid, citraconic acid or the corresponding esters or anhydrides.

An ethylenically unsaturated mono- or triacid may be chosen from, for example, the group: linoleic acid or the other unsaturated fatty acids, cinnamic acid, atropic acid, acrylic acid, methacrylic acid, ethacrylic acid, propacrylic acid, crotonic acid, isocrotonic acid or corresponding ester or anhydride derivatives.

Other diacids are preferably saturated aliphatic or aromatic. Aliphatic and aromatic diacids are chosen from, for example, the group: succinic acid, glutaric acid, methylglutaric acid, adipic acid, sebacic acid, pimelic acid, phthalic acid, isophthalic acid, terephthalic acid, dihydrophthalic acid, tetrahydrophthalic acid, tetrachlorophthalic acid, 3,6-endomethylene-1,2,3,6-tetrahydrophthalic acid and hexachloroendomethylenetetrahydrophthalic acid or the corresponding ester or anhydride derivatives.

Mono- and/or higher-functional aromatic or aliphatic carboxylic acids are chosen from, for example, the group consisting of: benzoic acid, ethylhexanoic acid, mono- or trimeric fatty acids such as stearic acid, acetic acid, propionic acid, pivalic acid, valeric acid, trimellitic acid, 1,2,3,4-butanetetracarboxylic acid, 1,2,4,5-benzenetetracarboxylic acid, 1,4,5,8-naphthalene-tetracarboxylic acid, 1,2,3-propanetricarboxylic acid, 1,2,3-tricarboxylic butane, camphoric acid, naphthoic acid, toluic acid, or the corresponding ester or anhydride derivatives.

The alcohols that may be used usually contain fewer than 30 carbon atoms, in particular fewer than 20 carbon atoms, although particularly ethoxylated or propoxylated bisphenol-A derivatives or polyethylene glycol and polypropylene glycol may contain higher numbers of carbon atoms Preferably, saturated aliphatic alcohols or alcohols containing an aromatic group are used; ethylenically unsaturated alcohols may also be used. Dialcohols are chosen from, for example, the group comprising ethylene glycol, di(ethylene glycol), tri(ethylene glycol), 1,2-propanediol, dipropylene glycol, 1,3-propanediol, 1,2-butanediol, 1,3-butanediol, 1,4-butanediol, 2-methyl-1,3-propanediol, 1,4-pentanediol, 1,4-hexanediol, 1,6 hexanediol, 2,2-dimethylpropanediol, cyclohexane-diol, 2,2-bis-(hydroxycyclohexyl)-propane, 1,2-trimethylolpropane monoallyl ether, pinacol, 2,2,4-trimethyl pentanediol-1,3,3-methyl pentanediol-1,5, bisphenol A ethoxylated or propoxylated with 1-20 equivalents and novolak prepolymers, if so desired partly etherified and ethoxylated. Instead of a 1,2-diol, the corresponding oxirane compound may be used.

Mono- and higher-functional alcohols are chosen from, for example, the group comprising methanol, ethanol, 1- or 2-propanol, 1- or 2-butanol, one of the isomers of pentanol, hexanol, octanol, 2-ethylhexanol, fatty alcohols, benzyl alcohols, 1,2-di(allyloxy)-3-propanol, glycerol, 1,2,3-propanetriol, pentaerythrytol, tris(hydroxyethyl)isocyanurate and novolak prepolymers, if so desired partly etherified and ethoxylated.

Alkoxilated unsaturated acids are particularly suitable to be used as ethylenically unsaturated alcohols, for example 2-hydroxyethyl(meth)acrylate, 2-hydroxypropyl(meth)acrylate, bis(2-hydroxy-ethyl)fumarate, but also, for example, butenediol.

It may be advantageous to use an unsaturated polyester modified with dicyclopentadienyl (DCPD) units.

The polymers can be manufactured in many ways, for example by melt condensation, solvent condensation with distillative removal of water, whether or not in an azeotropic mixture, by epoxy-acid reactions and other methods known to a person skilled in the art.

The compound containing one or more vinyl groups usually contains fewer than 50 carbon atoms, preferably fewer than 30 and more in particular fewer than 15, but more than 3 carbon atoms. The compound containing one or more vinyl groups is preferably of the vinyl aromatic, vinyl ether, vinyl ester, acrylate and/or allyl type. More in particular, a vinyl aromatic or acrylate compound is used, because these react quickly in the radical polymerization.

Vinyl aromatic compounds are chosen from, for example, the group comprising styrene, α-methylstyrene, o-, m-, p-methylstyrene, p-chlorostyrene, t-butylstyrene, divinylbenzene, bromostyrene, vinylnaphthalene, α-chlorostyrene and divinylnaphthalene.

Acrylate compounds are chosen from, for example, the group comprising methyl, ethyl, propyl, isopropyl, butyl, isobutyl, phenyl, and benzyl acrylate or methacrylate, 2-ethylhexyl (meth)acrylate, dihydrodicyclopentadiehe acrylate, cyclohexyl (meth)acrylate, butanediol (meth)acrylate, (meth)acrylamide, butanediol di(meth)acrylate, the reaction products of (meth)acrylic acid and phenyl- or cresylglycidyl ethers, propylene glycol di(meth)-acrylate, di- and triethylene glycol di(meth)acrylate, di- and tripropylene glycol di(meth)acrylate, hexanedioldi(meth)acrylate, trimethylolpropanetri(meth)acrylate. Derivatives of acrylates substituted with C2-C4 at position β may also be used, for example 2-hydroxyethyl(meth)acrylate and 2-hydroxypropyl(meth)-acrylate.

Vinyl ether, vinyl ester and allyl compounds are chosen from, for example, the group comprising allylphthalate, triallylcyanurate, diallylphthalate, diallylisophthalate, diallylterephthalate, ethylhexanoic vinyl ester, vinyl acetate, vinyl propionate, vinyl pivalate, vinyl ether, vinyl versatate, vinyl propylol ether, divinyl ether, vinyl butylol ether and vinyl benzylalcohol ethers.

In addition, the compound preferably contains one or more antioxidants such as hydroxybenzophenone, esters of salicylic acid and hydroxyphenylbenzotriazoles.

The composition preferably contains mould release agents.

In addition, the composition preferably contains one or more inhibitors in amounts between 0.005 and 0.2, preferably between 0.01 and 0.1 wt % with respect to the setting mixture. Known inhibitors that may be used are: hydroquinone, toluquinone, toluhydroquinone, 2,6-dimethylhydroquinone, p-t-butylcatechol, p-benzoquinone, chloranil, 2,6-dimethylquinone, nitrobenzene, m-dinitrobenzene, thiodiphenylamine, salts of N-nitro-N-cyclohexylhydroxylamine, 2,3-dichloro-,5,6-dicyano-p-benzoquinone, copper naphthanate, 1,2-naphthoquinone, 2-t-butyl-1,4-hydroquinone and hydroquinone monoalkyl ether.

The initiator system is preferably chosen from the group consisting of peroxides, perketals and percarbonates. Examples are hydrogen peroxide, benzoyl peroxide, t-butyl peroxide, t-butyl peroctoate, t-butyl perbenzoate, dicumyl peroxide, di-t-butyl peroxide, trimethylcyclohexanone perketal, methylethylketone peroxide, acetylacetone peroxide, cyclohexanone peroxide, methyl isobutyl ketone peroxide, and diacetone alcohol peroxide.

Furthermore, catalysts may be added, for instance octoates or naphthenates of copper, lead, calcium, magnesium, cerium and, in particular, of manganese and cobalt, or vanadium complexes. Promoters may also be added to these accelerators, for instance acetylacetone. Aromatic amines such as dimethylaniline, diethylaniline or dimethylparatoluidine may also be used as catalysts.

The highly unsaturated polyester preferably has a molar mass between 500 and 8000, in particular between 1000 and 5000, an acid number between 5 and 50 and an OH number between 0 and 100. The acid and hydroxyl numbers are defined as mg KOH per gram of polymer according to ASTM D 1936-70 and ASTM E 222-73, respectively.

The slightly unsaturated polyester preferably has a molar mass between 500 and 5000, in particular between 1000 and 4000. The acid number is between 5 and 50 and the OH number between 0 and 50.

The slightly unsaturated polyester is preferably prepared in two steps, in which an excess of glycol component is esterified with a dicarboxylic acid component in the first step and then quickly esterified with 1,2-alkenedicarboxylic acid in the second step, 1-12 mole % of the unsaturated dicarboxylic acid component of the first step consisting of or being isomerized into trans-1,2-alkenedicarboxylic acid, and the esterification process in the second step being effected with alkenedicarboxylic acid or with a derivative thereof, in which step the amount of this acid or derivative is chosen such that it amounts to 1-30 mole % of the total amount of dicarboxylic acid. In practice the first step is often carried out at a reaction temperature of 190°-220° C. to an acid number of 10 and an OH number of 15-60, after which a further reaction takes place with 1,2-alkenedicarboxylic anhydride in the second step at a temperature of 110°-170° C. in 0.5-4 hours. At this lower reaction temperature isomerization reactions are avoided and transesterification reactions are suppressed. It is effective to carry out this esterification in an inert atmosphere and to discharge the reaction water, for example azeotropically. When the unsaturated polyester has been obtained, it is cooled and usually diluted with preferably between 15 and 70 wt % of one or more vinyl compounds as described above. Further details regarding the slightly unsaturated polyesters are given in EP-A-31977.

The invention also relates to an intermediate comprising a resin mixture of an unsaturated polyester, a monomer containing a vinyl group, a slightly unsaturated polyester, the usual additives and reinforcing fibres, the resin mixture being thickened, characterized in that as slightly unsaturated polyester an unsaturated polyester is used which has a molar mass per double bond of 1200–20,000 and an acid number of 5–50, and in which between 50 and 90% of the unsaturation consists of a terminal monoester of an $\alpha, \beta$-unsaturated dicarboxylic acid.

The thickening reaction is usually effected by adding metal oxides and metal hydroxides such as MgO and $Mg(OH)_2$, in an amount of 1–10 wt %, based on the resin mixture.

Glass fibre, in the form of continuous fibres or as fibres with lengths between 0.5 mm and 5 cm, is usually used as reinforcing fibre used in an amount between 30 and 300 parts by weight based on the resin mixture.

Additionally, polyester, carbon, aramid, and acrylic fibres, for example, may also be used.

The usual fillers, which are used in 50–500 parts by weight, based on the polyester+monomer, are, for instance, chalk, talc, silica, gypsum and carbon black.

The invention will be elucidated with the following examples, without being limited thereto.

EXAMPLE I–IV, COMPARATIVE EXAMPLES A–D

Synthesis of slightly unsaturated polyester resins

A reactor equipped with a stirrer, thermometer, vigreux column, cooler and nitrogen supply was filled with the ingredients required for the first reaction step at room temperature (see Table 1). This mixture was then heated to a temperature of 210° C., with distillation of water. The reaction was continued until the product had an acid number of 5–10.

The polyester was then cooled to a temperature of 150° C. At that point the desired amount of maleic anhydride was added. After a reaction time of 2 hours at a temperature of 150° C., the mixture was cooled to 100° C. At this temperature the mixture was diluted with styrene, which contained 100–200 ppm of benzoquinone, to a solids content of 65+2%. The acid number and the viscosity (Emila, 23° C.) of the polyester resins obtained were determined (see Table 2).

Polyester intermediates: SMC formulations

An unsaturated polyester with a (calculated) molar mass per polymerizable double bond of 156 was prepared, in a manner known to a person skilled in the art, from propylene glycol and maleic anhydride. As a 67% solution in styrene, the highly unsaturated polyester had an acid number of 25 and a viscosity of 1200 mPa.s (Emila, 23° C.).

The SMCs were composed of:
80 parts of highly unsaturated polyester resin 20 parts of anti-shrinkage additive (65% solution in styrene); see Table 1.
180 parts of calcium carbonate
10 parts of grey pigment paste
5 parts of zinc stearate (mould release agent)
4 parts of magnesium oxide paste (35% MgO)
1.5 parts of tert.butylperbenzoate (peroxide)
100 parts of (25 mm long) glass fibers All tested compositions presented good thickening behaviour; the additive was not separated.

When the SMCs had matured sufficiently, they were moulded. The shrinkage, glass (reflection at angles of 20° and 60°), surface smoothness and colourability of the cured products were determined. The results are given in Table 3.

TABLE 1

POLYESTER RESINS

| | | examples | | | | comparative experiments* | | | |
|---|---|---|---|---|---|---|---|---|---|
| | | I | II | III | IV | A | B | C | C |
| 1st step | adipic acid | 9.0 | 9.0 | 4.5 | 8.8 | 9.7 | 9.0 | 9.0 | 9.3 |
| | sebacic acid | | | 4.5 | | | | | |
| | fumaric acid | 0.3 | 0.3 | 0.3 | | 0.3 | 1.0 | — | — |
| | DCPD maleate** | | | | 0.3 | | | | |
| | neopentyl glyc. | 9.4 | 9.5 | 9.5 | 9.3 | 10.3 | 9.5 | 9.5 | 9.6 |
| | trimethylolpropane | | 0.3 | 0.2 | 0.2 | | 0.2 | 0.3 | 0.2 |
| 2nd step | maleic anhydride | 0.7 | 0.7 | 0.7 | 0.9 | — | — | 1.0 | 0.7 |

*Comparative examples A and B: exclusively central unsaturated groups
Comparative examples C and D: exclusively terminal unsaturated groups
**DCPD maleate is the addition product of maleic acid and dicyclopentadiene.

TABLE 2

| polyester resin | molar mass per double bond | acid number | viscosity, mPa.s according to Emila 23° C. |
|---|---|---|---|
| I | 1875 | 15 | 850 |
| II | 1925 | 17 | 780 |
| III | 2250 | 18 | 1100 |
| IV | 1625 | 16 | 830 |
| A | 6550 | 6 | 750 |
| B | 1925 | 13 | 1050 |
| C | 1925 | 9 | 980 |
| D | 2750 | 18 | 650 |

TABLE 3

| Exp. | Linear shrinkage in % | Gloss; reflection at an angle of 20° | 60° | Surface quality* (visual) | Colourability* (visual) |
|---|---|---|---|---|---|
| I | 0.00 | 66 | 89 | 1 | 1 |
| II | 0.03 | 60 | 83 | 1 | 4 |
| III | 0.02 | 57 | 88 | 2 | 3 |
| IV | 0.00 | 53 | 81 | 1 | 3 |
| A | 0.04 | 58 | 85 | 3 | 3 |
| B | 0.09 | 55 | 84 | 5 | 2 |
| C | 0.03 | 32 | 80 | 3 | 5 |
| D | 0.00 | 55 | 81 | 3 | 5 |

*Classification: 1 = very good, 5 = poor.

We claim:
1. Composition comprising
A: 30–65 parts by weight of unsaturated polyester with a molar mass per double bond of 142–500
B: 25–55 parts by weight of ethylenically unsaturated monomer
C: 3–35 parts by weight of slightly ethylenically unsaturated polyester as anti-shrinkage additive
D: 0–750 parts by weight of filler, fibrous material and other additives, characterized in that as slightly ethylenically unsaturated polyester an unsaturated polyester is used which has a molar mass per double bond of 1200–20,000, an acid number of 5–50, and in which between 50 and 90% of the unsaturation consists of a terminal monoester of an $\alpha, \beta$-unsaturated dicarboxylic acid.

2. Composition according to claim 1, characterized in that as anti-shrinkage additive a polyester is used which has a molar mass per double bond between 1300 and 5000.

3. Composition according to claim 2, characterized in that a polyester with a molar mass per double bond between 1500 and 3000 is used as anti-shrinkage additive.

4. Composition according to claim 2, characterized in that as anti-shrinkage additive an unsaturated polyester is used in which at least two thirds of the unsaturation consists of $\alpha$, $\beta$-unsaturated dicarboxylic acid end groups.

5. Intermediate product comprising a resin mixture of an unsaturated polyester, a monomer containing a vinyl group and a slightly unsaturated polyester, and reinforcing fibres, the resin mixture being thickened, characterized in that as slightly unsaturated polyester an unsaturated polyester is used which has a molar mass per double bond of 1200–20,000, an acid number of 5–50, and in which between 50 and 90% of the unsaturation consists of a terminal monoester of an $\alpha$, $\beta$-unsaturated dicarboxylic acid.

6. A product according to claim 5 which contains one or more additives chosen from antioxidants, mould release agents, inhibitors, initiators, and catalysts.

* * * * *